(12) United States Patent
Nakazato et al.

(10) Patent No.: US 8,713,070 B2
(45) Date of Patent: Apr. 29, 2014

(54) BUSINESS FLOW PROCESSING METHOD AND APPARATUS

(75) Inventors: Katsuhisa Nakazato, Kawasaki (JP); Tsuyoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 12/848,526

(22) Filed: Aug. 2, 2010

(65) Prior Publication Data

US 2010/0299373 A1   Nov. 25, 2010

Related U.S. Application Data

(63) Continuation of application No. PCT/JP2008/052030, filed on Feb. 7, 2008.

(51) Int. Cl.
*G06F 17/30* (2006.01)
*G06Q 20/00* (2012.01)

(52) U.S. Cl.
USPC .......................................... 707/802; 705/16

(58) Field of Classification Search
None
See application file for complete search history.

(56) References Cited

U.S. PATENT DOCUMENTS

| | | | |
|---|---|---|---|
| 4,965,763 A | 10/1990 | Zamora | |
| 6,038,538 A | 3/2000 | Agrawal et al. | |
| 6,278,977 B1 | 8/2001 | Agrawal et al. | |
| 6,457,014 B1 | 9/2002 | Parker | |
| 6,816,902 B1 | 11/2004 | Bandat et al. | |
| 7,155,424 B2 * | 12/2006 | Ikezawa et al. | 1/1 |
| 7,487,163 B2 | 2/2009 | Nomura et al. | |
| 7,562,339 B2 | 7/2009 | Racca et al. | |
| 7,809,822 B2 | 10/2010 | Gotta et al. | |
| 7,912,946 B2 | 3/2011 | Sengupta et al. | |

(Continued)

FOREIGN PATENT DOCUMENTS

| | | |
|---|---|---|
| JP | 2003-256627 | 9/2003 |
| JP | 2005-115494 | 4/2005 |

(Continued)

OTHER PUBLICATIONS

W.M.P. van der Aaist; "Flexible Workflow Management Systems: An Approach Based on Generic Process Model", DEXA '99, LNCS 1677, pp. 186-195, 1999. Springer-Verlag Berlin Heidelberg 1999.

(Continued)

*Primary Examiner* — Tarek Chbouki
(74) *Attorney, Agent, or Firm* — Fujitsu Patent Center

(57) ABSTRACT

In order to identify a parallel-executed portion of processes included in a business flow, following stages are executed: obtaining transaction records including a processing time, a process type and an identifier from a database; grouping the transaction records based on the identifier and sorting the transaction records within a group based on the processing time; in case where the processing time included in the transaction record represents only one time, calculating a processing period of each transaction record based on a sequence of the processing times in the transaction records in the group; identifying a transaction record relating to a process executed in parallel based on the distribution of the calculated processing periods for each process type; and identifying, for each group, a business flow of the group based on the processing result of the identifying the transaction record and the transaction records in the group.

6 Claims, 18 Drawing Sheets

(56) References Cited

U.S. PATENT DOCUMENTS

| | | | |
|---|---|---|---|
| 2003/0065702 A1* | 4/2003 | Singh et al. | 709/105 |
| 2005/0076059 A1 | 4/2005 | Nomura et al. | |
| 2006/0026599 A1* | 2/2006 | Herington et al. | 718/105 |
| 2006/0074970 A1* | 4/2006 | Narayanan et al. | 707/102 |
| 2006/0265416 A1* | 11/2006 | Seki et al. | 707/102 |
| 2007/0168494 A1* | 7/2007 | Liu et al. | 709/224 |
| 2007/0203589 A1 | 8/2007 | Flinn et al. | |
| 2007/0226222 A1* | 9/2007 | Yamamoto et al. | 707/9 |
| 2008/0021867 A1 | 1/2008 | Nomura et al. | |
| 2008/0320486 A1 | 12/2008 | Bose et al. | |
| 2009/0076877 A1 | 3/2009 | Yano et al. | |
| 2009/0077380 A1* | 3/2009 | Leymann et al. | 713/170 |
| 2009/0094074 A1 | 4/2009 | Nikovski et al. | |

FOREIGN PATENT DOCUMENTS

| | | |
|---|---|---|
| JP | 2005-173847 | 6/2005 |
| JP | 2006-031326 | 2/2006 |
| JP | 2006-134106 | 5/2006 |
| JP | 2006-197294 | 7/2006 |
| JP | 2006-285313 | 10/2006 |
| JP | 2007-279861 | 10/2007 |
| WO | WO/2007/132547 | 11/2007 |

OTHER PUBLICATIONS

Extended European Search Report dated Nov. 7, 2012 corresponding to European Application No. 08711854.3.

* cited by examiner

| IDENTIFIER | PROCESS TYPE | PROCESSING TIME |
|---|---|---|
| ID001 | PROCESS A | 2007/01/10 13:11:36 |
| ID001 | PROCESS B | 2007/01/11 11:07:56 |
| ID001 | PROCESS C | 2007/01/11 11:09:47 |
| ID001 | PROCESS D | 2007/01/12 09:58:13 |

| IDENTIFIER | PROCESS TYPE | PROCESSING TIME |
|---|---|---|
| ID001 | PROCESS A | 2007/01/10 13:11:36 |
| ID001 | PROCESS B | 2007/01/11 11:07:56 |
| ID001 | PROCESS C | 2007/01/11 11:09:47 |
| ID001 | PROCESS D | 2007/01/12 09:58:13 |

| IDENTIFIER | PROCESS TYPE | PROCESSING START TIME | PROCESSING END TIME |
|---|---|---|---|
| ID001 | PROCESS A | 2007/01/10 12:56:42 | 2007/01/10 13:11:36 |
| ID001 | PROCESS B | 2007/01/10 13:12:09 | 2007/01/11 11:07:56 |
| ID001 | PROCESS C | 2007/01/11 11:08:01 | 2007/01/11 11:09:47 |
| ID001 | PROCESS D | 2007/01/11 11:09:51 | 2007/01/12 09:58:13 |

| IDENTIFIER | PROCESS TYPE | PROCESSING START TIME | PROCESSING END TIME |
|---|---|---|---|
| ID001 | PROCESS A | 2007/01/10 12:56:42 | 2007/01/10 13:11:36 |
| ID001 | PROCESS B | 2007/01/10 13:12:09 | 2007/01/11 11:07:56 |
| ID001 | PROCESS C | 2007/01/10 13:12:10 | 2007/01/11 11:09:47 |
| ID001 | PROCESS D | 2007/01/11 11:09:51 | 2007/01/12 09:58:13 |

| IDENTIFIER | PROCESS TYPE | PROCESSING START TIME | PROCESSING END TIME |
|---|---|---|---|
| ID001 | PROCESS A | 2007/01/10 12:56:42 | 2007/01/10 13:11:36 |
| ID001 | PROCESS B1 | 2007/01/10 13:12:09 | 2007/01/11 00:59:58 |
| ID001 | PROCESS C | 2007/01/10 13:12:10 | 2007/01/11 11:09:47 |
| ID001 | PROCESS B2 | 2007/01/11 01:03:47 | 2007/01/11 11:07:56 |
| ID001 | PROCESS D | 2007/01/11 11:09:51 | 2007/01/12 09:58:13 |

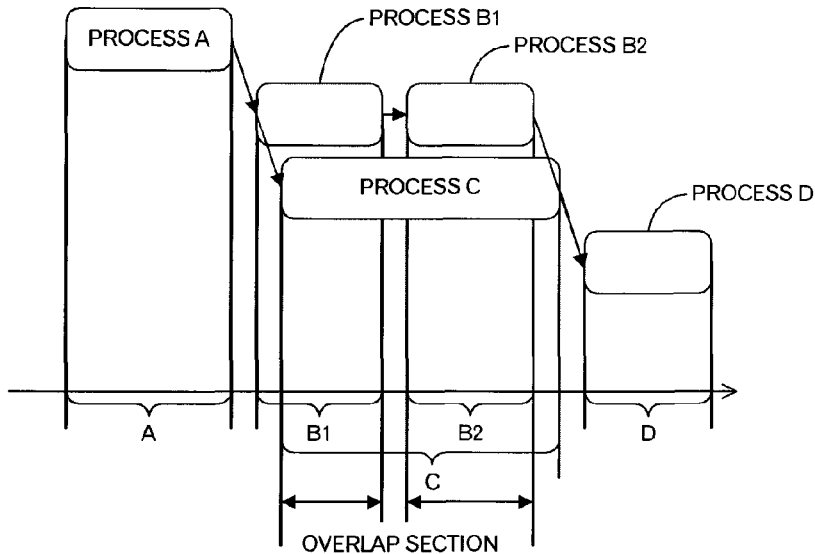

FIG.13

| GROUP CODE | PROCESS TYPE BELONGING TO THIS GROUP | COMBINATION OF NON-CONCURRENT PROCESSES IN GROUP |
|---|---|---|
| NONE | PROCESS A, PROCESS B, PROCESS C, PROCESS D | --- |

FIG.14

| GROUP CODE | PROCESS TYPE BELONGING TO THIS GROUP | COMBINATION OF NON-CONCURRENT PROCESSES IN GROUP |
|---|---|---|
| NONE | PROCESS A, PROCESS D | --- |
| 1 | PROCESS B, PROCESS C | NONE |

FIG.15

| GROUP CODE | PROCESS TYPE BELONGING TO THIS GROUP | COMBINATION OF NON-CONCURRENT PROCESSES IN GROUP |
|---|---|---|
| NONE | PROCESS A, PROCESS D | --- |
| 1 | PROCESS B1, PROCESS B2, PROCESS C | PROCESS B1 – PROCESS B2 |

FIG.16

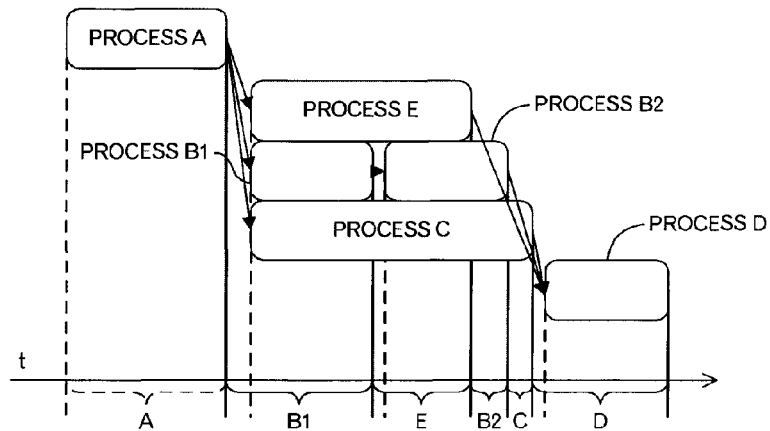
FIG.28
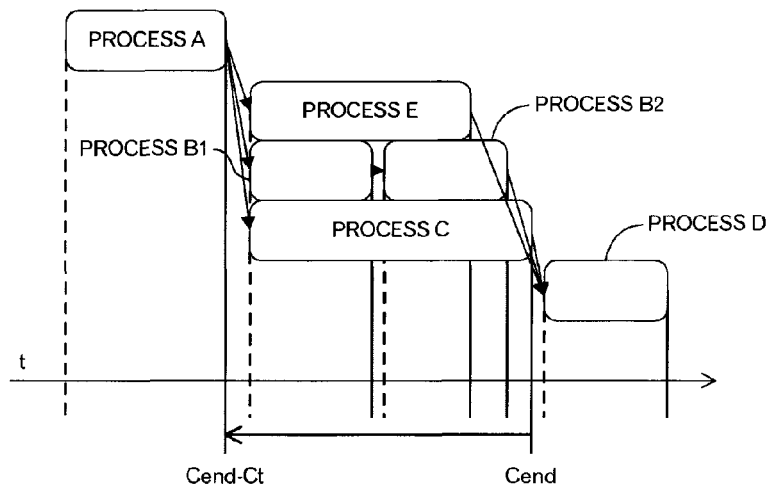
FIG.29
| GROUP CODE | PROCESS TYPE BELONGING TO THIS GROUP | COMBINATION OF NON-CONCURRENT PROCESSES IN GROUP |
|---|---|---|
| NONE | PROCESS A, PROCESS D | — |
| 1 | PROCESS B1, PROCESS B2, PROCESS C, PROCESS E | PROCESS B1-PROCESS B2 |
FIG.30

BUSINESS FLOW PROCESSING METHOD AND APPARATUS

CROSS-REFERENCE TO RELATED APPLICATIONS

This application is a continuation application, filed under 35 U.S.C. section 111(a), of International Application PCT/JP2008/052030, filed Feb. 7, 2008, the entire contents of which are incorporated herein by reference.

FIELD

This invention relates to a technique for extracting a business flow from a database, more particularly to a business flow processing technique for enabling to detect a portion carried out in parallel among business processes.

BACKGROUND

For example, Japanese Laid-Open Patent Publication No. 2005-115494 discloses a technique, which relates to a business process tracking apparatus, for enabling to track a flow of a business process including plural applications executed over different business systems, without changing an existing system. Specifically, an event management apparatus collects event data that an event extractor of the respective business systems extracted based on event extraction definition, and queues the event data into an event queue. An event association unit gathers, for each business data unit, the event data to carry out association between the business data, and stores results into an event management database (DB). When a search condition is inputted from a user terminal, an output unit searches the event management DB according to the search condition, and outputs and displays the association between the business data in a tree format to the user terminal.

SUMMARY

As one aspect of this invention, business flow processing method includes: obtaining transaction records including a processing time, a process type and an identifier from a database (e.g. the obtaining includes generating the transaction records by using data extracted from the database.); grouping the transaction records based on the identifier, and sorting the transaction records in the group based on the processing time; calculating a processing period for each transaction record, based on a sequence of the processing times in the transaction records within the group, in case where the processing time included in the transaction record represents one time; first identifying a transaction record relating to a process carried out in parallel based on distribution, for each process type, of the calculated processing periods; and second identifying, for each group, a business flow of the group from processing results of the first identifying and the transaction records within the group. Incidentally, business flows of the groups may be superimposed and outputted.

BRIEF DESCRIPTION OF DRAWINGS

FIG. 13 is a diagram schematically depicting a case of FIG. 12;

FIG. 14 is a diagram depicting a management table in case of FIG. 8;

FIG. 15 is a diagram depicting a management table in case of FIG. 10;

FIG. 16 is a diagram depicting a management table in case of FIG. 12;

FIG. 28 is a diagram depicting an example of a case where the parallel execution of the processes is included;

FIG. 29 is a diagram schematically depicting a processing for identifying the processes executed in parallel;

FIG. 30 is a diagram depicting an example of the management table;

DESCRIPTION OF EMBODIMENTS

Figures 1, 2:
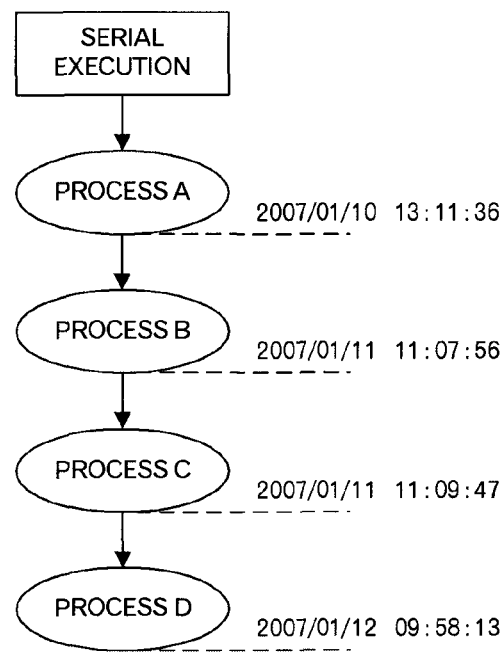
FIG. 1 is a diagram depicting an example of transaction records.
FIG. 2 is a diagram depicting a business flow in a case where serial execution is assumed.
Figure 3:
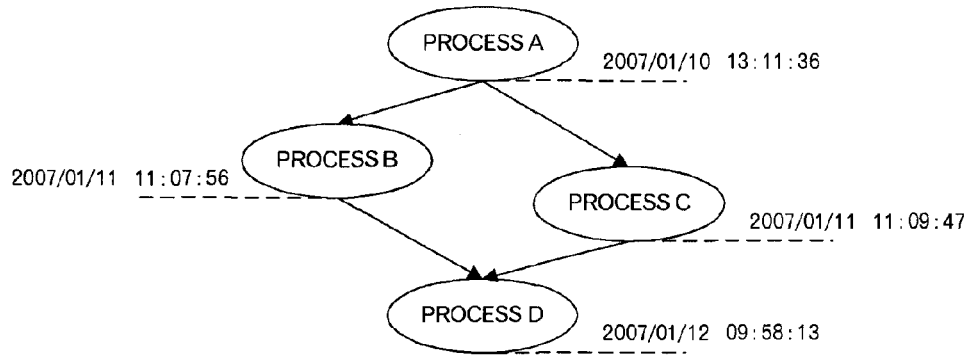
FIG. 3 is a diagram depicting a business flow in a case where parallel execution is carried out.

According to the technique described in the background, when data as depicted in FIG. 1 is stored in the event management DB, the serial business flow such as a flow of processes A, B, C and D is generated, as depicted in FIG. 2, by simply arranging the processing times in time series. However, it is impossible to confirm such a case where the processes B and C are actually carried out in parallel after the process A, as depicted in FIG. 3, and after that, the process D is carried out.

Therefore, this embodiment of this invention enables to detect the portion carried out in parallel in the processes when the business flow is extracted from the database.

Figure 4:
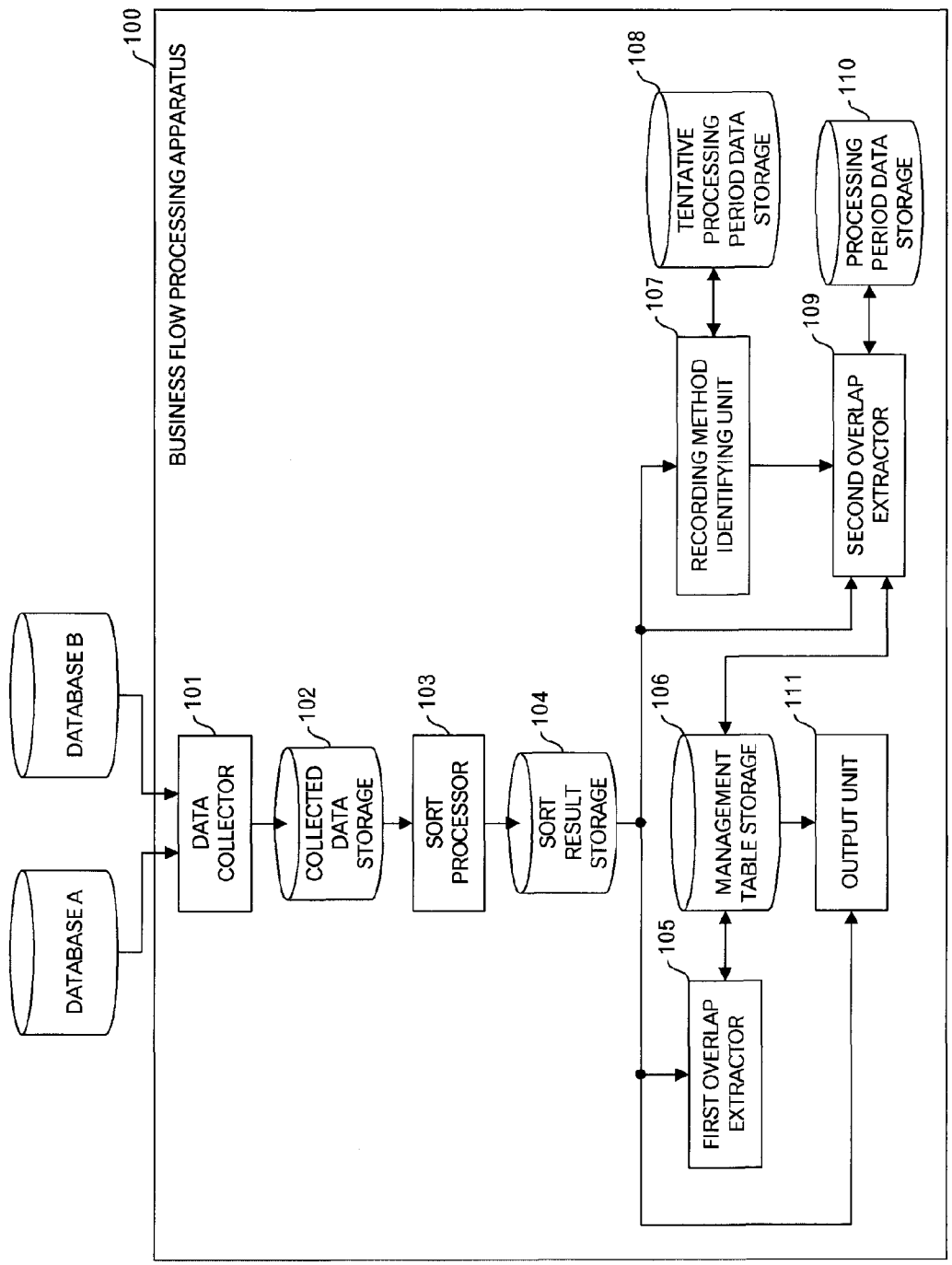
FIG. 4 is a functional block diagram of a business flow processing apparatus relating to an embodiment of this invention.

FIG. 4 depicts a functional block diagram of a business flow processing apparatus 100 relating to one embodiment of this invention. It is assumed that the business flow processing apparatus 100 is connected to one or plural analysis target database such as databases A and B. In addition, the business flow processing apparatus 100 has a data collector 101 that carries out a processing to collect data from the analysis target databases A and B; a collected data storage 102 that stores the data collected by the data collector 101; a sort processor 103 that carries out a processing to sort the data stored in the collected data storage 102 by using an identifier and processing time; a sort result storage 104 that stores processing results of the processing result; a first overlap extractor 105 that carries out a processing by using data stored in the sort result storage 104; a recording method identifying unit 107 that carries out a processing to identify the recording method by using the data stored in the sort result storage 104; a tentative processing period data storage 108 that stores data during the processing in the recording method identifying unit 107; a second overlap extractor 109 that carries out a processing by using outputs from the recording method identifying unit 107 and the data stored in the sort result storage 104; a processing period data storage 110 that stores data during the processing in the second overlap extractor 109; a management table storage 106 that stores a management table that is a processing result of the first overlap extractor 105 or the second overlap extractor 109; and an output unit 111 that outputs a process instance (that is an example of a business flow) and/or a business flow generated by superimposing the process instances by using the data stored in the sort result storage 104 and the management table stored in the management table storage 106.

Figure 6:
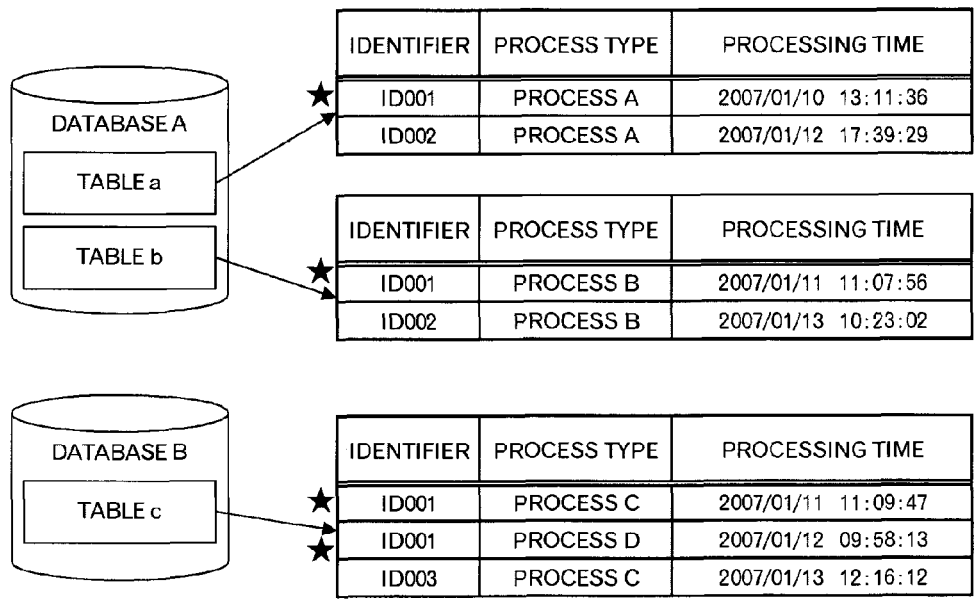
FIG. 6 is a diagram schematically depicting a data collection processing.
Figure 5A:
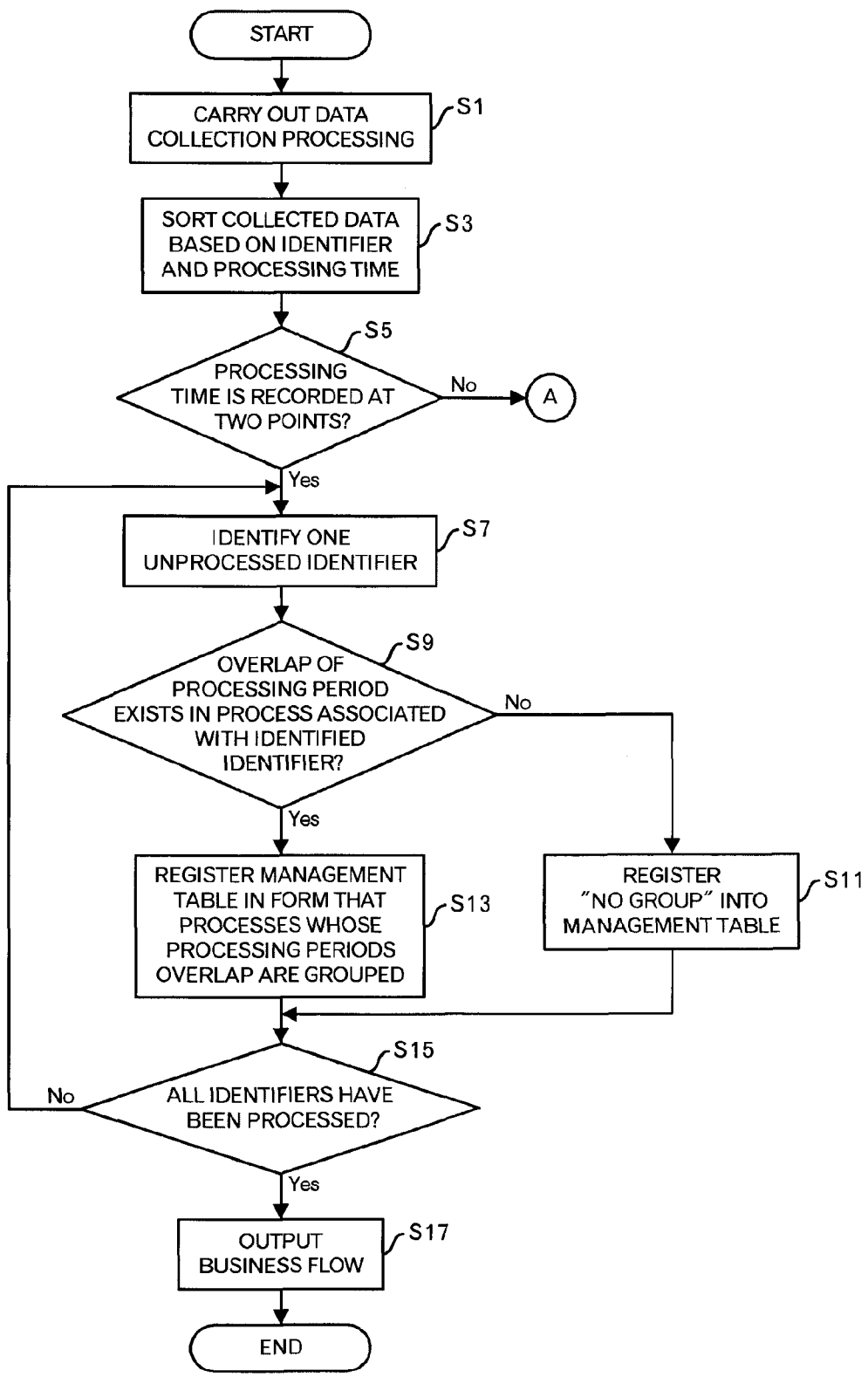
FIG. 5A is a diagram depicting a first portion of a processing flow relating to the embodiment of this invention.

Next, processing contents of the business flow processing apparatus 100 will be explained by using FIGS. 5A to 33. First, the data collector 101 carries out a data collection processing to extract transaction records required to generate a business flow from the analysis target databases A and B, and stores the collected record data into the collected data storage 102 (FIG. 5A: stage S1). For example, as schematically depicted in FIG. 6, tables a and b are stored in the database A, and transaction records respectively including an identifier, process type and processing time are extracted from the table a, and similarly, transaction records respectively including the identifier, process type and processing time are extracted from the table b. In addition, a table c is stored in the database B, and transaction records respectively including the identifier, process type and processing time are extracted from the table c. Incidentally, when one record in the tables a to c does not include any one of the identifier, process type and processing time, the data collector 101 carries out a processing to obtain, for example, the process type from the table name, and the like, and generates the transaction records including the identifier, process type and processing time as depicted in the right side of FIG. 6 and stores them into the collected data storage 102. Moreover, although an example of one-point recording of the processing time is depicted here, two-point recording that the start time and end time are recorded may be adopted as described below. In such a case, the processing time includes two times.

Figures 7, 8, 9:
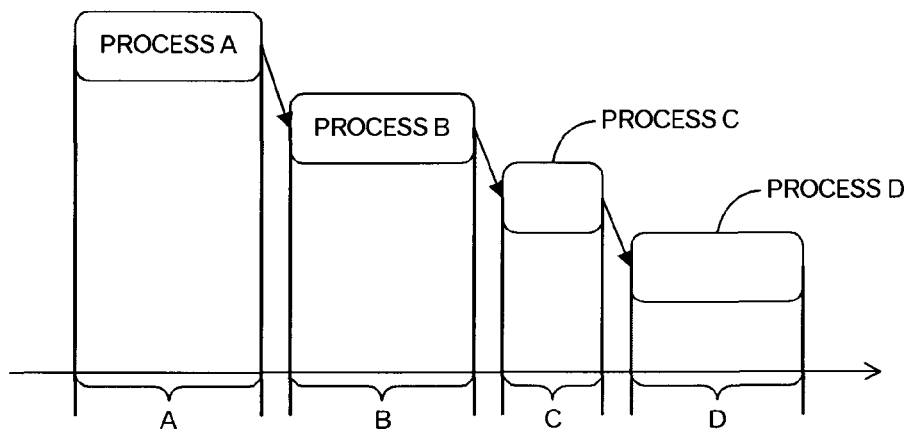
FIG. 7 is a diagram depicting an example of data stored in a sort result storage.
FIG. 8 is a diagram depicting an example of data stored in the sort result storage in case of two-point recording.
FIG. 9 is a diagram schematically depicting a case of FIG. 8.

Next, the sort processor 103 sorts the transaction records stored in the collected data storage 102 by using the identifier and the processing time, and stores the sort results into the sort result storage 104 (stage S3). The same identifier means a series of processes for the same case. Therefore, the transaction records are grouped based on the identifier, and by sorting the grouped transaction records based on the processing time, the order of the execution of the respective processes is identified. In an example of FIG. 6, when the transaction records whose identifier is ID001 and to which a star mark is attached are grouped and arranged in the ascending order of the processing time, data as depicted in FIG. 7 is generated and stored into the sort result storage 104. Incidentally, the transaction records whose identifier is other than ID001 is similarly grouped and sorted, and then stored into the sort result storage 104. The group constituted by the grouping at the stage S3 is called a process group, hereinafter.

Then, the first overlap extractor 105 and recording method identifying unit 107 judge, from the data stored in the sort result storage 104, whether or not the two-point recording of the processing time is carried out (stage S5). It is judged whether or not the end time and the start time are recorded as the processing time. When it is judged that the one-time recording is carried out, the flow shifts to the processing depicted in FIG. 5B through a terminal A, without the processing of the first overlap extractor 105.

On the other hand, when the two-point recording of the processing time is carried out, the first overlap extractor 105 identifies one unprocessed identifier among the identifiers included in the transaction records stored in the sort result storage 104 (stage S7). Then, the first overlap extractor 105 judges whether or not the overlap of the processing periods exists in the processes (specifically, transaction records in the same process group) associated with the identified identifier (stage S9).

For example, when it is assumed that data as depicted in FIG. 8 is stored in the sort result storage 104, the start time of the process B is set to be later than the end time of the process A, the start time of the process C is set to be later than the end time of the process B, the start time of the process D is set to be later than the end time of the process C. Therefore, as schematically depicted in FIG. 9, it can be understood that there is no portion executed in parallel during the processes A to D and the processes are serially carried out.

Figures 10, 11, 12:
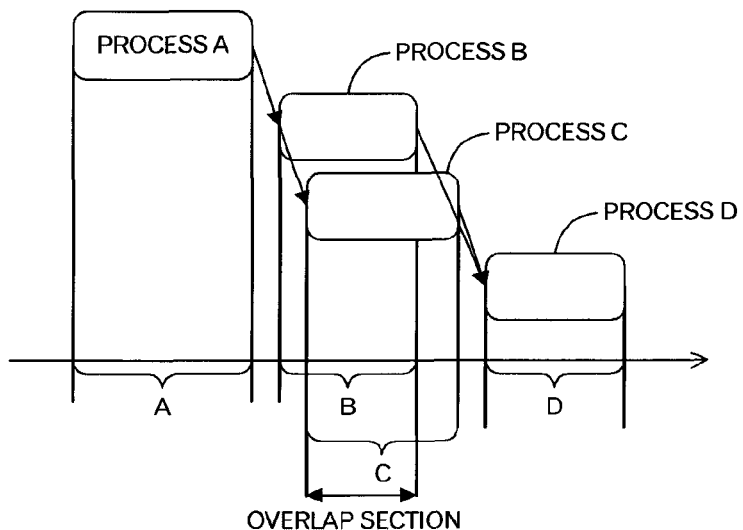
FIG. 10 is a diagram depicting an example of data stored in the sort result storage in case of two-point recording.
FIG. 11 is a diagram schematically depicting a case of FIG. 10.
FIG. 12 is a diagram depicting an example of data stored in the sort result storage in case of two-point recording.

On the other hand, when it is assumed that data as depicted in FIG. 10 is stored in the sort result storage 104, the start times of the processes B to D are set to be later than the end process A, but the start time of the process B is set to be earlier than the end time of the process B. Incidentally, the start time of the process D is set to be later than the end time of the process B and the end time of the process C. Such a situation is schematically depicted in FIG. 11. As depicted in FIG. 11, it can be understood that a portion (i.e. overlap section) of the processes B and C is carried out in parallel.

Furthermore, when it is assumed that data as depicted in FIG. 12 is stored in the sort result storage 104, the start times of the process B1 to D are set to be later than the end time of the process A. However, the start time of the process C is set to be earlier than the end time of the process B1, and further the end time of the process C and the start time of the process B2 are set to be later than the end time of the process B1, and the end time of the process C is set to be later than the start time and end time of the process B2. Incidentally, the start time of the process D is set to be later than the end times of the processes A to C. Such a situation is schematically depicted in FIG. 13. As depicted in FIG. 13, although the processes A, B1, B2 and D are serially carried out, it can be understood that the process C is carried out in parallel with a portion (i.e. overlap section) of the processes B1 and B2. The processes B1 and B2 are serially carried out. However, the serially executed processes can be also identified in the portion executed in parallel.

Thus, at the stage S9, it is judged, from the start times and end times of the respective transaction records, whether or not the overlap section for the processing periods exists.

As depicted in FIGS. 8 and 9, when it is judged that there is no overlap in the processing period, the first overlap extractor 105 registers a management table for the currently processed identifier, which represents "no group" into the management table storage 106 (stage S11). Specifically, a management table as depicted in FIG. 14 is registered. In an example of the management table depicted in FIG. 14, a group code, process types belonging to the group and a combination of non-concurrent processes in the group are registered. Incidentally, because of "no group", no group code is registered, and simply the processes A to D are registered as the process types of the processes, which are serially carried out. In addition, as for the combination of the non-concurrent processes in the group, no data is registered, because of "no group". Incidentally, because of "no group", the process types belonging to the group may be empty, since the business flow can be drawn by the transaction records stored in the sort result storage 104.

On the other hand, as depicted in FIGS. 10 to 13, when there is an overlap in the processing period, the first overlap extractor 105 stores a management table in a form that the processes whose processing periods overlap are grouped, into the management table storage 106 (stage S13). For example, in case of FIGS. 10 and 11, the processes B and C are grouped, and "no group" is detected for the processes A and D, which are serially carried out. Incidentally, because there is no non-concurrent process in the group, "none" is registered for the combination of the non-concurrent processes in the group. Namely, the management table as depicted in FIG. 15 is stored into the management table 106. Furthermore, in case of FIGS. 12 and 13, the processes B1, B2 and C are grouped, and as depicted in FIG. 16, no group is assigned to the processes A and D, which are serially carried out. Incidentally, because the processes, which are serially carried out in the group, are the processes B1 and B2, the processes B1 and B2 are registered to the column of the combination of the non-concurrent processes in the group. Incidentally, because the start time and end time are recorded, it is easy to judge that there is no overlap between the processing periods of the processes B1 and B2.

Then, after the stage S13 or S11, the first overlap extractor 105 judges whether or not all of the identifiers have been processed (stage S15). When an unprocessed identifier exists, the processing returns to the stage S7. On the other hand, when all of the identifiers have been processed, the output unit 111 outputs a business flow (e.g. process instance) to an output device (e.g. display device) by using the data stored in the sort results storage 104 and the management table storage 106 (stage S17). For example, the display as depicted in FIGS. 2 and/or 3 are made on the display device.

Thus, in case of adopting the two-point recording, it is possible to identify the correct processing period and to correctly judge the parallel execution. Accordingly, the correct business flow can be presented for the user.

Figure 5B:
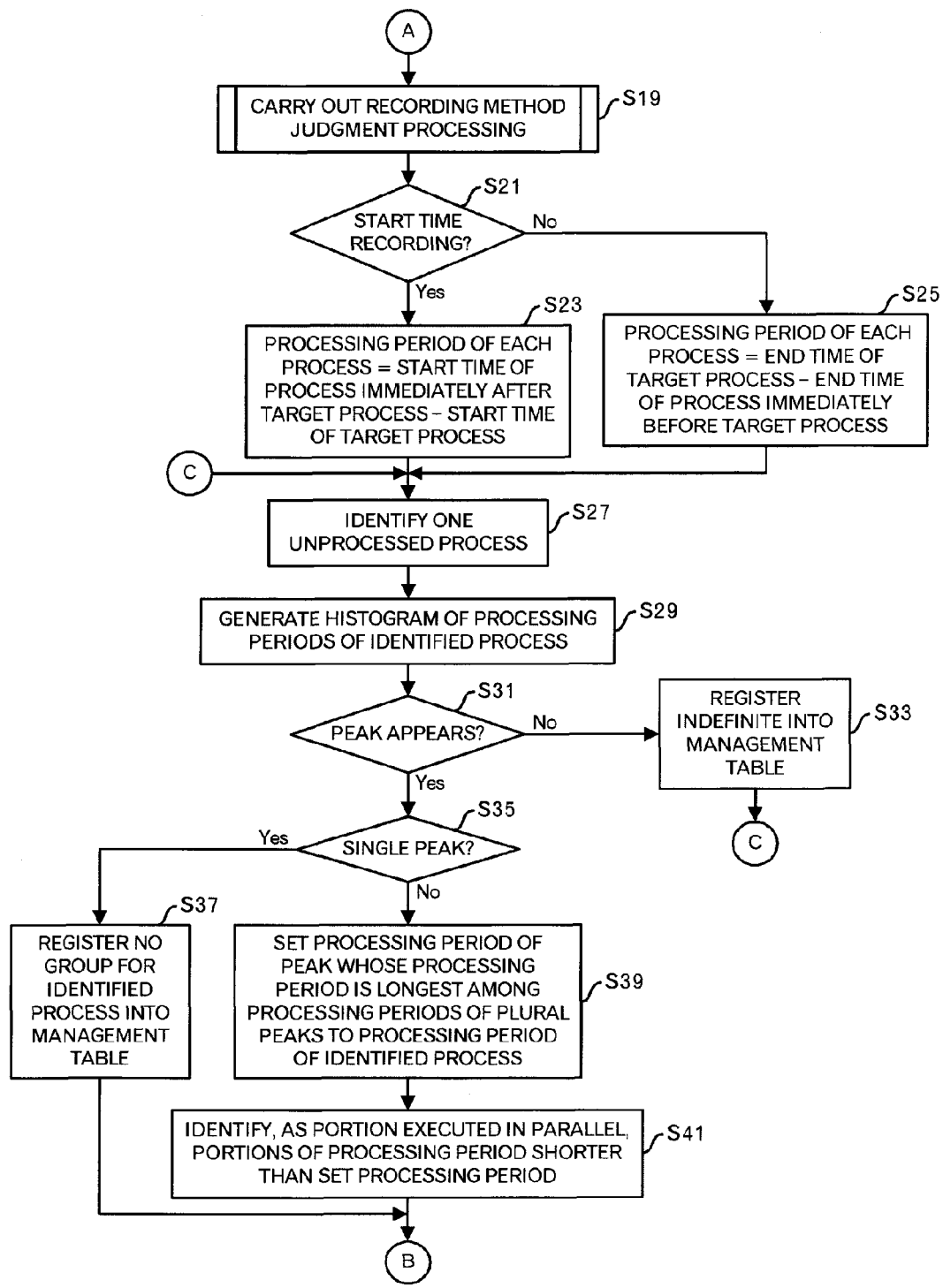
FIG. 5B is a diagram depicting a second portion of the processing flow relating to the embodiment of this invention.

Next, a processing after the terminal A will be explained by using FIGS. 5B and 17 to 33. When it is judged at the stage S5 that the one-time recording was carried out, the recording method identifying unit 107 carries out a recording method judging processing (FIG. 5B: stage S19). The recording method judging processing will be explained by using FIGS. 17 to 21B. Incidentally, when it is possible to apparently identify, from schema information, column name of the database and/or like, which of the start time recording and end time recording was made, such information is effective. When it is unknown from such information, the processing described below is carried out.

Incidentally, when the recording method is unknown from the column names or the like, as depicted in FIGS. 17 to 20, it is necessary to judge, in case of the one-point recording, which of the start time recording and end time recording was made, in consideration of following cases as depicted in FIGS. 17 to 20, namely, a case (FIG. 17) where the start time was recorded and only the serial execution was carried out, a case (FIG. 18) where the end time was recorded and only the serial execution was carried out, a case (FIG. 19) where the start time was recorded and the parallel execution was included and a case where (FIG. 20) where the end time was recorded and the parallel execution was included, even when the transaction records depicted in FIG. 7 are stored in the sort result storage 104.

Figure 17:
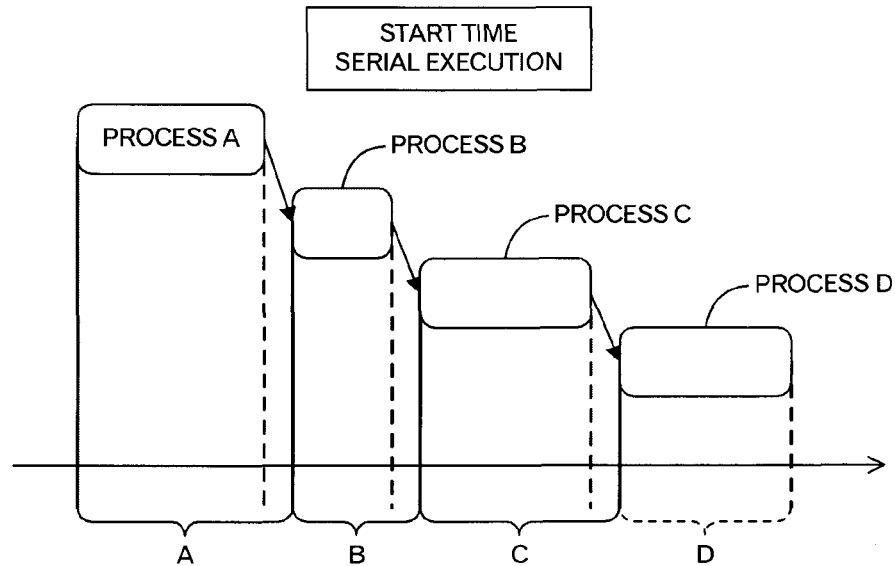
FIG. 17 is a diagram schematically depicting a flow of the processes in case where the processes are executed serially and the start time recording is carried out.
Figure 18:
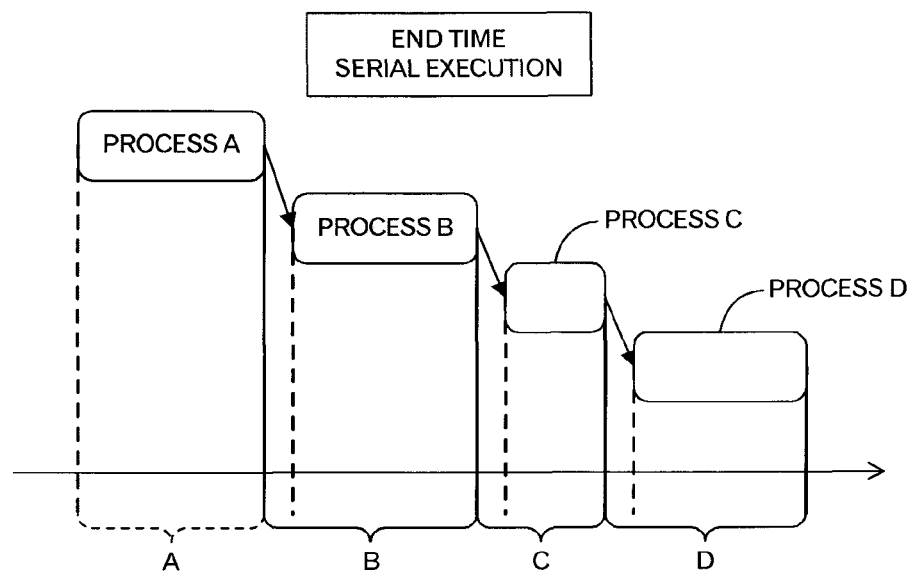
FIG. 18 is a diagram schematically depicting a flow of the processes in case where the processes are executed serially and the end time recording is carried out.
Figure 19:
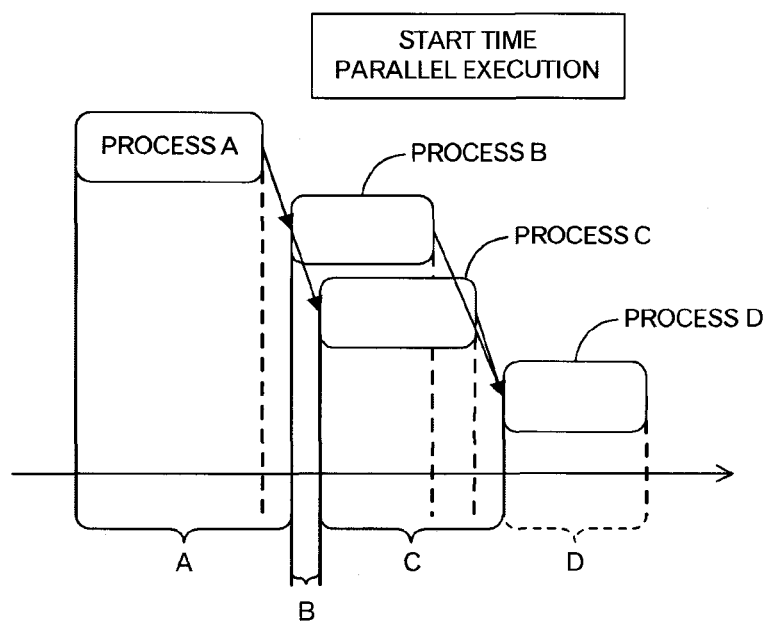
FIG. 19 is a diagram schematically depicting a flow of the processes in case where the processes are executed in parallel and the start time recording is carried out.
Figure 20:
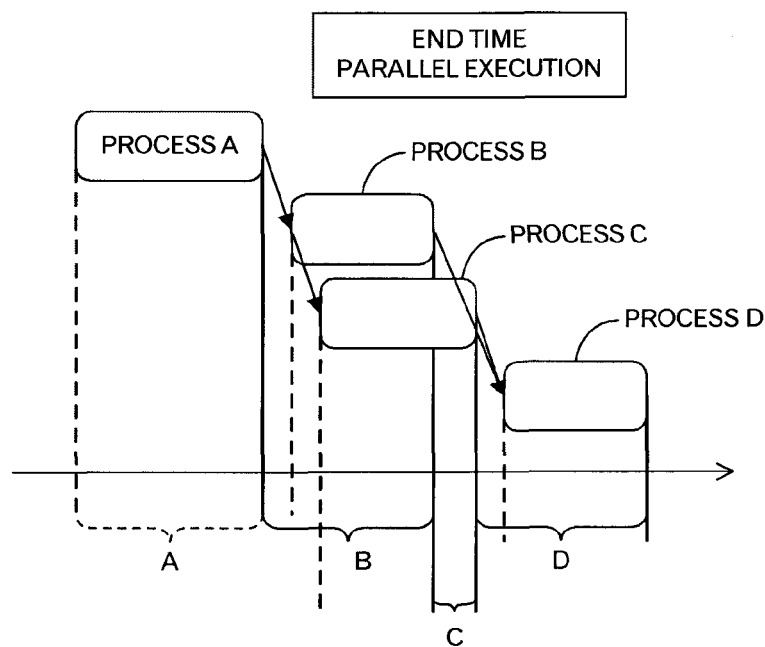
FIG. 20 is a diagram schematically depicting a flow of the processes in case where the processes are executed in parallel and the end time recording is carried out.

Specifically, as understood from FIG. 7, the difference between the processing times of the processes B and C is small. In such a case, as depicted in FIGS. 17 and 18, even when it is assumed that all of the processes are serially executed, the processing period of the process B becomes short in case where the processing time means the start time, and the processing period of the process C becomes short in case where the processing time means the end time. Accordingly, which of cases is applicable influences identification of the portion executed in parallel, which will be explained later. In addition, in case of the parallel execution, as depicted in FIGS. 19 and 20, even if the superficial processing period is short, the actual processing period may not be short.

In this embodiment, under the assumption that (A) the variations of the actual processing periods for each process do not arise so much even when trying the process a lot of times, and even if the variations arises, the distribution of the processing periods follows the normal distribution, (B) the respective processing periods have an inherent processing period, and there is some difference between the processes, and (C) a gap between the previous process end and the next process start is small in the extent that it can be disregarded or the gap becomes an inherent value with small discrepancy, it is assumed that the processing times for calculating the processing period were recorded plural time for each process, and a statistic processing as described in the following is carried out. That the processing times for calculating the processing period were recorded plural time for each process means that one kind of processing flow route are executed plural times, plural kinds of processing flow routes including the same process are executed plural times or both of them. Typically, when the number of processing times and/or the number of kinds of routes becomes larger, it is possible to carry out the more accurate judgment.

Figure 21A:
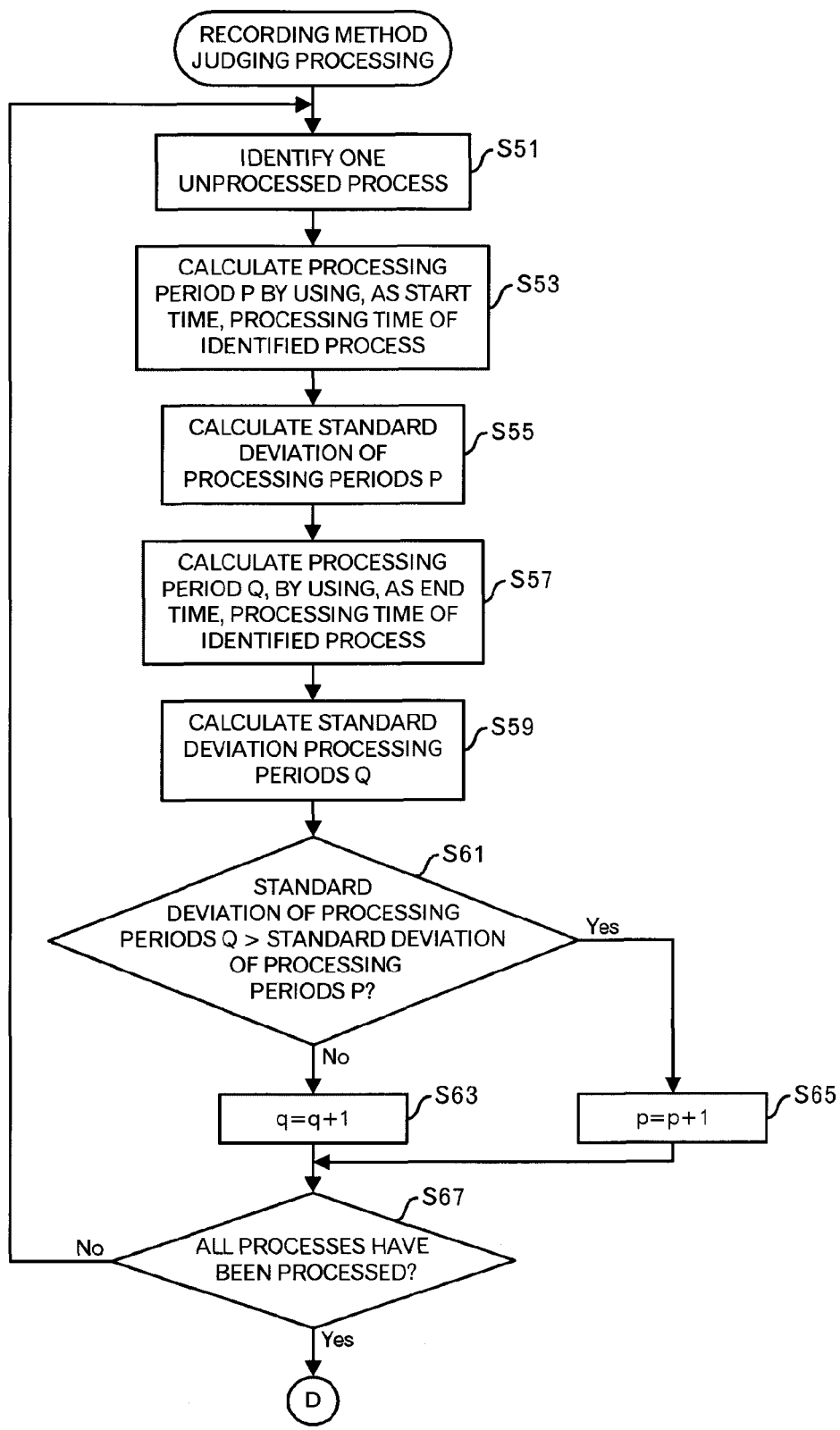
FIG. 21A is a diagram depicting a processing flow of a recording method judging processing.

Under the aforementioned assumptions, the recording method identifying unit 107 identifies one unprocessed process among the processes included in the transaction records stored in the sort result storage 104 (FIG. 21A: stage S51). Then, the recording method identifying unit 107 calculates a processing period P using the processing time of the identified process as the start time, and stores the period P into the tentative processing period data storage 108 (stage S53).

Figure 22:
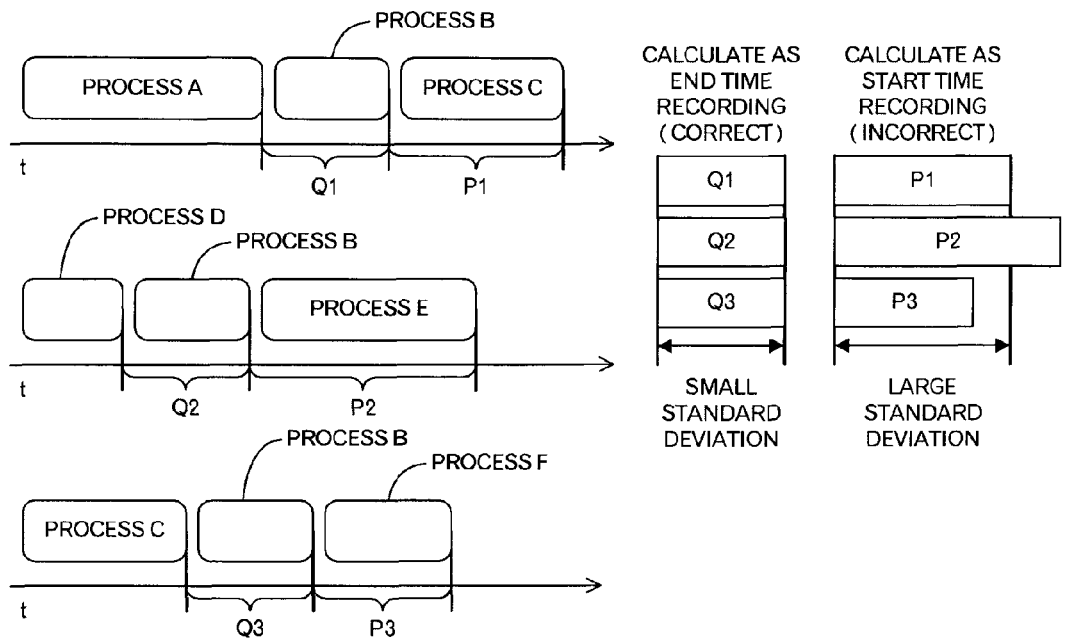
FIG. 22 is a diagram schematically depicting the recording method judging processing.

For example, as depicted in the left side of FIG. 22, in case where the processes A, B and C were executed in this order, in case where the processes D, B and E were executed in this order, and in case where the processes C, B and F are executed in this order, we pay attention to the process B now. However, it is assumed that the end time recording is carried out, here. Then, at the stage S53, in the left side of FIG. 22, the processing periods P1, P2 and P3 are calculated and stored into the tentative processing period data storage 108.

After that, the recording method identifying unit 107 calculates a standard deviation of the processing period P (stage S55). The variance may be used, not the standard deviation. Any other statistic value representing the dispersion may be used. The standard deviation and/or variance are stored into a storage device such as the tentative processing period data storage 108 or main memory.

On the other hand, the recording method identifying unit 107 calculates a processing period Q using the processing time of the identified transaction as the end time, and stores the period Q into the tentative processing period data storage 108 (stage S57). As depicted in the left side of FIG. 22, the processing periods Q1, Q2 and Q3 are calculated, and stored into the tentative processing period data storage 108.

Then, the recording method identifying unit 107 calculates the standard deviation of the processing period Q (stage S59). The variance may be used, not the standard deviation. Any other index representing the dispersion may be used. The standard deviation or variance is also stored into the storage device such as the tentative processing period data storage 108 or main memory.

Then, the recording method identifying unit 107 judges whether or not the standard deviation (or variance) of the processing period Q is greater than the standard deviation (or variance) of the processing period P (stage S61).

As depicted in the right side of FIG. 22, this embodiment adopts consideration that the processing period of the actual recording method among the end time recording and the start time recording has small dispersion. As described above, in the example of FIG. 22, the end time recording is the actual recording method. Therefore, the standard deviation of Q1 to Q3 is less than the standard deviation of P1 to P3.

Therefore, the recording method identifying unit 107 increments a counter p for the start time recording by one, when the standard deviation (or variance) of the processing period P is less (stage S65). On the other hand, when the standard deviation (or variance) of the processing period Q is less or the standard deviation of the processing period P is equal to the processing period Q, the recording method identifying unit 107 increments a counter q for the end time recording by one (stage S63). The case where both values are equal may not be counted.

In case of the processes executed in parallel, as depicted in FIGS. 19 and 20, it is estimated that the variations of the processing periods P and Q arise in some extent, depending on the state of the parallel execution. Therefore, it is difficult to judge which of the start time recording and the end time recording was made, according to one process. Then, the aforementioned processing is carried out for all of the processes to count, by using the counter p for the start time recording, the number of processes whose standard deviation or the like of the processing period in the start time recording is less and also count, by using the counter q for the end time recording, the number of processes whose standard deviation or the like of the processing period in the end time recording is less.

After the stage S63 or S65, the recording method identifying unit 107 judges whether or not all of the processes have been processed (stage S67). When an unprocessed process exists, the flow returns to the stage S51. When no unprocessed process exists, the flow shifts to a processing of FIG. 21B through a terminal D.

Figure 21B:
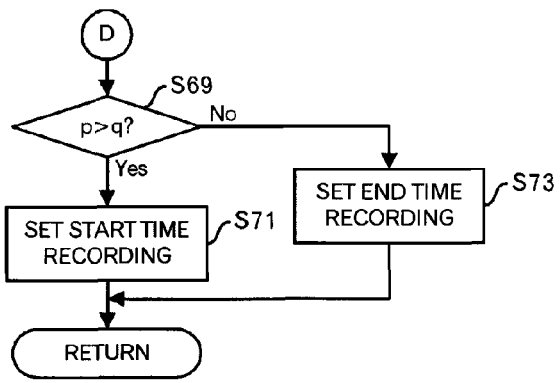
FIG. 21B is a diagram depicting a processing flow of the recording method judging processing.

Shifting to the explanation of the processing of FIG. 21B, the recording method identifying unit 107 judges whether or not the value of the counter p is greater than the value of the counter q (stage S69). When the value of the counter p is greater than the value of the counter q, the recording method identifying unit 107 sets the start time recording to the second overlap extractor 109 (stage S71). On the other hand, when it cannot be said that the value of counter p is greater than the value of the counter q, the recording method identifying unit 107 sets the end time recording to the second overlap extractor 109 (stage S73). Then, the flow returns to the calling source processing.

Returning to the explanation of FIG. 5B, the second overlap extractor 109 judges whether or not the start time recording is set (stage S21). When the start time recording is set, the second overlap extractor 109 calculates the processing periods of the respective transaction records stored in the sort result storage 104 according to ((start time of the process immediately after a target process)−(start time of the target process)) by using data stored in the transaction records stored in the sort result storage 104, and stores the calculation result into the processing period data storage 110 (stage S23). For example, the calculated processing period is stored in association with the identifier included in the transaction record and the process type. On the other hand, when the end time recording is set, the second overlap extractor 109 calculates the processing periods of the respective transaction records stored in the sort result storage 104 according to ((end time of the target process)−(end time of the process immediately before the target process)) by using data of the transaction records stored in the sort result storage 104, and stores the calculation result into the processing period data storage 110 (stage S25). For example, the calculated processing period is stored in association with the identifier included in the transaction record and the process type.

When the stage S23 or S25 has been carried out, preparation of a processing to identify portions executed in parallel has been completed. In the following processing, under the assumption that (A) the variations of the actual processing periods for each process do not arise so much even when trying the process a lot of times, and even if the variations arises, the distribution of the processing periods follows the normal distribution, (B) the respective processing periods have an inherent processing period, and there is some difference between the processing periods, and (C) a gap between the previous process end and the next process start is small in the extent that it can be disregarded or the gap becomes an inherent value with small discrepancy, it is assumed that the processing times for calculating the processing period were recorded plural times for each process, and a statistic processing as described in the following is carried out. That the processing times for calculating the processing period were recorded plural time for each process means that one kind of processing flow route are executed plural times or plural kinds of processing flow routes including the same process are executed plural times or both of them. Typically, when the number of processing times and/or the number of kinds of routes becomes larger, it is possible to carry out the more accurate judgment.

First, the second overlap extractor 109 identifies one unprocessed process among the processes included in the transaction records stored in the sort result storage 104 or data stored in the processing period data storage 110 (stage S27). Then, the second overlap extractor 109 generates a histogram of the processing periods for the identified process (stage S29).

Figure 23:
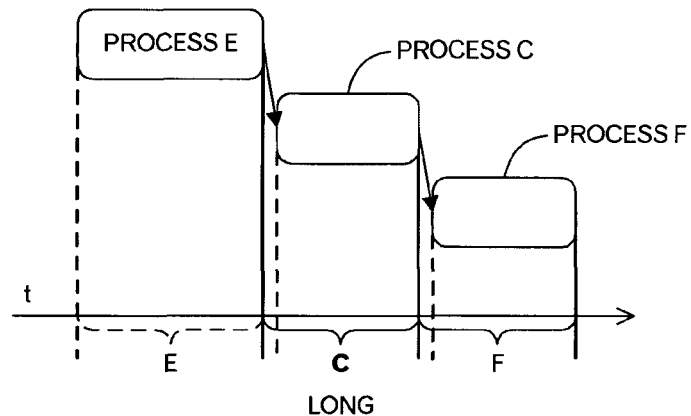
FIG. 23 is a diagram depicting an example of the serial execution of the processes.
Figure 24:
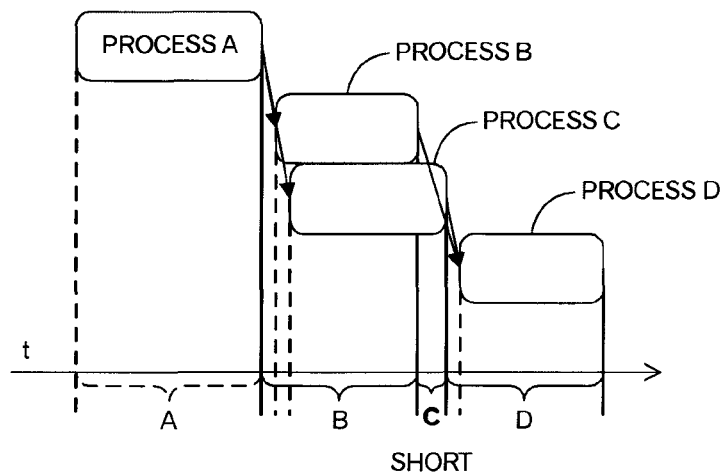
FIG. 24 is a diagram depicting an example of the parallel execution of the processes.
Figure 25:
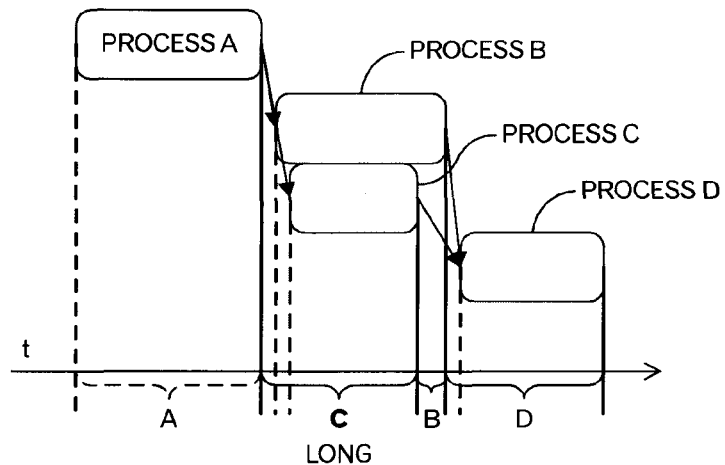
FIG. 25 is a diagram depicting an example of the parallel execution of the processes.
Figure 26:
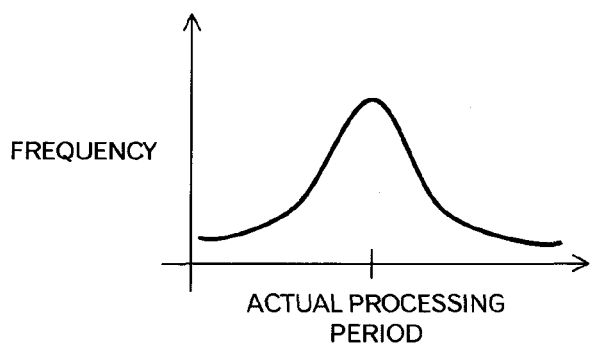
FIG. 26 is a diagram depicting an example of a histogram of the processing periods in case where only serial execution of the processes exists.
Figure 27:
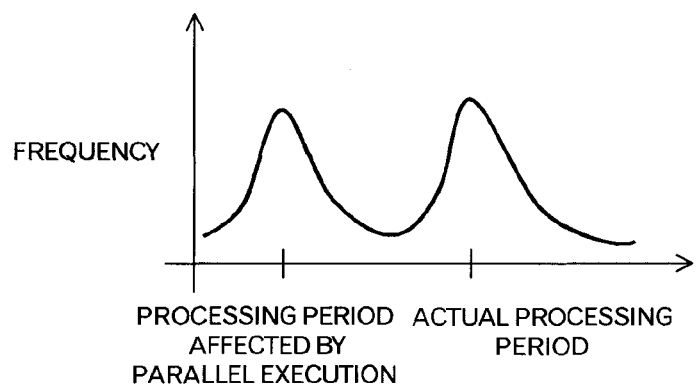
FIG. 27 is a diagram depicting an example of the histogram of the processing periods in case where both of the serial execution and parallel execution of the processes.
Figure 31:
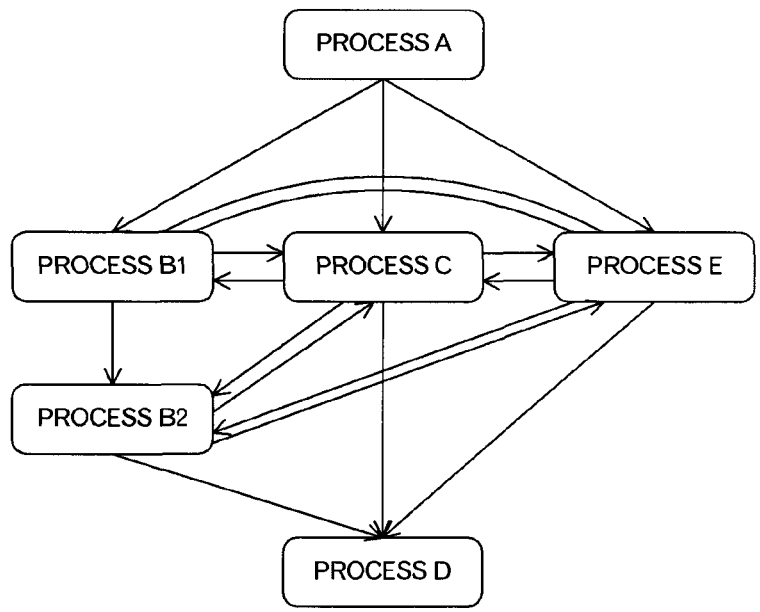
FIG. 31 is a diagram depicting a conventional example of the business flow.

For example, as depicted in FIG. 23, when the processes E, C and F are serially executed (in case of the end time recording), the processing period of the process C becomes long. However, as depicted in FIG. 24, when the processes B and C are executed in parallel, the superficial processing period of the process C may be much shorter. Furthermore, as depicted in FIG. 25, although the processes B and C are executed in parallel in the same manner, the superficial processing period of the process C may become short or long, depending on the fluctuation of the processing periods. Therefore, by generating the histogram of the processing period for the same process at the stage S29, a peak statistically occurs at the processing period in case of the serial execution, and one or plural peaks occur at the superficial processing periods at the parallel execution in case of the parallel execution. In case of the process, which is executed only serially, one peak is detected as depicted in FIG. 26. The processing period of this peak is presumed to be actual processing period. In addition, when both of the parallel execution and serial execution are carried out, plural peaks are detected as depicted in FIG. 27. The processing period in case of the serial execution is always longer than the superficial processing period at the parallel execution. Therefore, in this embodiment, when plural peaks appear, the processing period of the peak whose processing period is the longest is presumed to be actual processing period.

Then, the second overlap extractor 209 judges whether or not any peak is detected in the histogram generated at the stage S29 (stage S31). The condition to detect the rise as the peak depends on the frequency of the execution of the process. Therefore, the condition is appropriately set. When no peak is detected, the actual processing period cannot be identified. Therefore, the second overlap extractor 109 registers "indefinite" for the identified process into the management table for all of the process groups to which the identified process belongs (stage S33). Then, the flow shifts to stage S27 through a terminal C.

On the other hand, when the peak is detected, the second overlap extractor 109 judges whether or not the peak is single (stage S35). When the peak is single, the process is executed only serially, as described above. Therefore, the second overlap extractor 109 registers "no grouping" for the identified process into the management table for all process groups to which the identified process belongs (stage S37). Then, the flow shifts to a processing of FIG. 5C through a terminal B.

On the other hand, when plural peaks are detected, as described above, the second overlap extractor 109 sets the processing period of the peak whose processing period is the longest among the processing periods of the plural peaks as the processing period of the process identified at the stage S27 (stage S39). For example, the processing period of the identified process is stored into the storage device such as the main memory. Then, the second overlap extractor 109 identifies portions (specifically, process group including a specific process whose processing period is shorter than the set processing period and the specific process) of the processing periods, which are shorter than the set processing period, as the portion executed in parallel (stage S41). For example, the specific process is stored in association with the management table of the pertinent group into the management table storage 106. Incidentally, this stage may be skipped, and all of the processes for which plural peaks are detected may be treated as the portions executed in parallel. Then, the flow shifts to the processing of FIG. 5C through the terminal B.

Figure 5C:
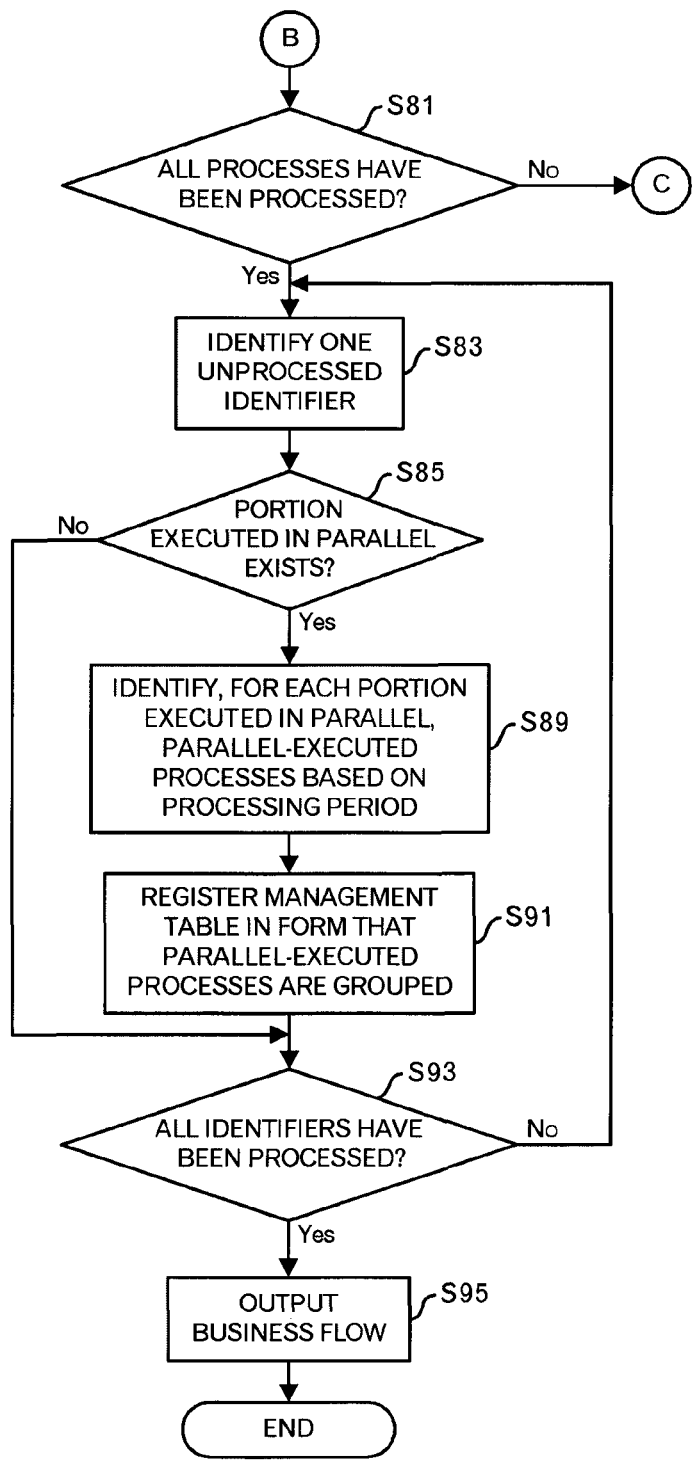
FIG. 5C is a diagram depicting a third portion of the processing flow of the embodiment of this invention.

Shifting to explanation of the processing of FIG. 5C, the second overlap extractor 109 judges whether or not all of the processes have been processed (stage S81). When an unprocessed process exists, the flow returns to the stage S27 through a terminal C. On the other hand, when all of the processes have been processed, the second overlap extractor 109 one unprocessed identifier among the identifiers included in the transaction records stored in the sort result storage 104 (stage S83). Then, the second overlap extractor 109 judges whether or not the portion executed in parallel is registered for the identified identifier (i.e. process group) (stage S85). In case of only "no group", the management table has been completed as depicted in FIG. 4 by repeating the stage S37. Therefore, the flow shifts to stage S93.

On the other hand, when the portion executed in parallel is registered, the second overlap extractor 109 identifies, for each portion executed in parallel, a process executed in parallel based on the processing periods (stage S89). Here, a case of FIG. 28 is assumed. In an example of FIG. 28, the end time recording is adopted. As apparent from FIG. 28, it is assumed that the process C is identified as the portion executed in parallel, and actually the processes E, B1 and B2 are executed in parallel. Incidentally, as depicted in the lower portion of FIG. 28, the processing period, which is calculated at the stage S25 and stored in the processing period data storage 110, is "A" for the process A, "B1" for the process B1, "E" for the process E, "B2" for the process B2, "C" for the process C and "D" for the process D. However, because the processes B1, B2, C and E are executed in parallel, the correct processing periods are not calculated.

Therefore, a start time of the process C, which is a process identified as the portion executed in parallel (in case of the end time recording. However, in case of the start time recording, the end time is applicable.), is calculated. When the end time of the process C is denoted as Cend and the processing period set for the process C at the stage S39 as the actual processing period is denoted as Ct, (Cend−Ct) is calculated as depicted in FIG. 29 (in case of the start time recording, the start time is denoted as Cstart, the end time is calculated by (Cstart+Ct)). Therefore, the process whose end time is recorded within a range from the start time (Cend−Ct) to the end time Cend is a process executed in parallel with the process C. Then, as apparent from FIGS. 28 and 29, the processes E, B1 and B2 are executed in parallel. Incidentally, in case of the start time recording, the process whose start time is recorded within a range from Cstart to (Cstart+Ct) is process executed in parallel.

Thus, the second overlap extractor 109 registers the management table in a form that the processes executed in parallel are grouped, into the management table 106 (stage S91). For example, in the example of FIGS. 28 and 29, the table as depicted in FIG. 30 is registered. The group includes the processes C, B1, B2 and E.

Incidentally, when paying attention to the process C, the processes executed in parallel are the processes B1, B2 and E. However, when paying attention to the process B1, the processes executed in parallel are only the processes E and C, when paying attention to the process B2, they are only the processes E and C, and when paying attention to the process E, they are the processes B1, B2 and C. Thus, when simply paying attention to the individual processes of the portions executed in parallel, groups of the processes executed in parallel are different. However, because it is necessary to identify a group including the parallel execution by a unit of the process group, which is based on the identifier, the groups of the processes executed in parallel are unified when the included processes overlap. Namely, the processes C, B1, B2 and E are grouped after the unification. Furthermore, when paying attention to the process B1, the process B2 is not included, and when paying attention to the process B2, the process B1 is not included. Therefore, it is determined that the processes B1 and B2 are serially carried out. Therefore, the processes B1 and B2 are identified as a combination of the non-concurrent processes in the group. Thus, when identifying the combination of the non-concurrent processes in the group, the start time and end time may be identified by using the actual processing period stored, for example, in the processing period data storage 110, and it may be checked whether or not there is no overlap.

As described above, a group of the processes executed in parallel in the group, which is based on the identifier, is identified and registered at the stage S91, and further the combination of the non-concurrent processes in the group is also identified and registered.

Then, when it is judged at the stage S85 that there is no portion executed in parallel or after the stage S91, the second overlap extractor 109 judges whether or not all of the identifiers have been processed (stage S93). When an unprocessed identifier exists, the flow returns to the stage S83.

On the other hand, when all of the identifiers have been processed, the output unit 111 outputs a business flow (here, process instance) by using data stored in the sort result storage 104 and the management table storage 106 (stage S95). For example, the display as depicted in FIGS. 2 and 3 are carried out on the display device.

At the stage S17 or S95, the business flow, which is generated by summarizing the process instances, may be output. Namely, the business flow is generated by superimposing the process instances to present the business flow.

Figure 32:
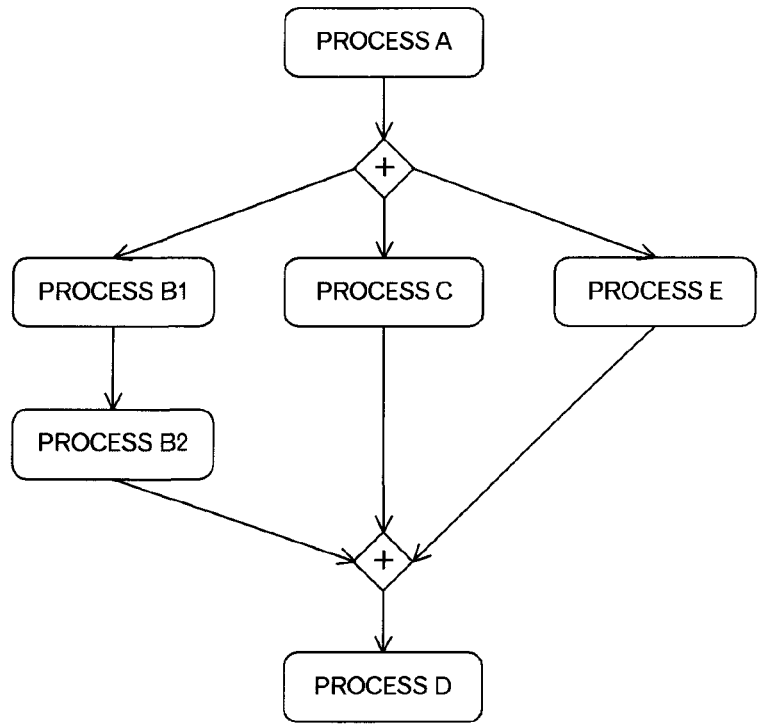
FIG. 32 is a diagram depicting an example of a business flow in case where the embodiment of this invention is carried out.

For example, when the serial execution is inaccurately recognized, there is possibility that various different process instances such as A-B1-B2-C-E-D, A-B1-C-B2-E-D, A-C-E-B1-B2-D and the like may be recognized, and by superimposing those process instances, a business flow in which the process instances are complicated may be generated. However, when the management table as depicted in FIG. 30 is generated, as depicted in FIG. 32, a business flow can be presented in which the processes A and D are executed serially, the processes C, E, B1 and B2 are executed in parallel, and the processes B1 and B2 among them are executed serially.

Although the embodiment of this invention was explained above, this invention is not limited to this. For example, the functional block diagram depicted in FIG. 4 is a mere example, and there is a case where it does not correspond to the program module configuration. In addition, the explanation was made under the assumption that the business flow processing apparatus 100 is implemented one computer. However, the processing may be allocated to plural computers. In addition, the processing flow may be changed, as long as the same result can be obtained.

Figure 33:
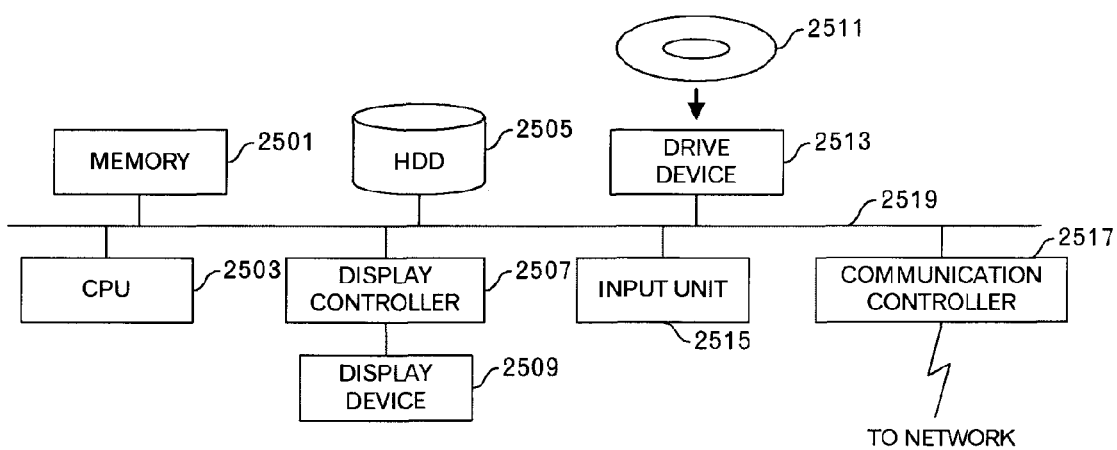
FIG. 33 is a functional block diagram of a computer.

In addition, the business flow processing apparatus 100 is a computer device as shown in FIG. 33. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 33. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

As one aspect of the embodiments, a business flow processing method includes: obtaining transaction records including a processing time, a process type and an identifier from a database (e.g. the obtaining includes generating the transaction records by using data extracted from the database.); grouping the transaction records based on the identifier, and sorting the transaction records in the group based on the processing time; calculating a processing period for each transaction record, based on a sequence of the processing times in the transaction records within the group, in case where the processing time included in the transaction record represents one time; first identifying a transaction record relating to a process carried out in parallel based on distribution, for each process type, of the calculated processing periods; and second identifying, for each group, a business flow of the group from processing results of the first identifying and the transaction records within the group. Incidentally, business flows of the groups may be superimposed and outputted.

By carrying out such a processing, even when the processing time is recorded at one time, it becomes possible to identify the transaction records relating to the process carried out in parallel. Accordingly, it becomes possible to determine which of the business flow including a portion carried out in parallel as depicted in FIG. 3 and the serial business flow as depicted in FIG. 2 is pertinent.

In addition, the aforementioned calculating may include: calculating a first tentative processing period for each transaction record in case where the processing time is a start time and a second tentative processing period for each transaction record in case where the processing time is an end time; calculating, for each process type, an index value representing distribution of the first tentative processing periods and an index value representing distribution of the tentative processing period; and comparing the index value representing the distribution of the first tentative processing periods with the index value representing the distribution of the second tentative processing periods and statistically judging which of the start time and the end time is pertinent to the processing time. In case of one time-point recording, the processing time is the start time or end time. However, it is impossible to calculate correct processing periods unless correct one is identified as described above. Here, the lesser one is judged to be true among the distribution of the first tentative processing periods calculated while assuming that the processing time means the start time and the distribution of the second tentative processing periods calculated while assuming that the processing time means the end time, and the number of times that the end time is judged to be true and the number of times that the start time is judged to be true are counted for plural process types. Then, it is possible to correctly judge which of the start time and end time is true and further to calculate the correct processing periods.

Furthermore, the aforementioned first identifying may include: judging, for each process type, whether or not plural peaks exist in the distribution of the calculated processing periods to identify, as a process carried out in parallel, a process type for which the plural peaks exist; identifying, as a deemed processing period, a processing period that is the longest among the processing periods of the plural peaks, for the process type (i.e. process) carried out in parallel; and judging, for each transaction record, by using the processing time in the pertinent transaction record, the deemed processing period and the processing times of the other transaction record in the group of the pertinent transaction record, whether or not the transaction record is a record relating to the process carried out in parallel. Incidentally, a case where the single peak is detected represents the process type, which is not carried out in parallel. Therefore, it is unnecessary to judge whether or not it is carried out in parallel. On the other hand, in case where the plural peaks are detected, because it is impossible to obtain the correct processing period by simply using the difference of the processing times in the group, the processing period that is the longest among the processing periods of the plural peaks is identified as the deemed processing period to judge based on the deemed processing period, whether or not it is carried out in parallel. In addition, in order to decrease the processing loads, it may be judged only for the transaction records whose processing period is identified to be shorter than the deemed processing period, whether or not it is carried out in parallel.

Furthermore, the business flow processing method may further include: when the processing time included in the transaction record includes the end time and the start time, third identifying, for each group, the transaction records relating to a process carried out in parallel based on the end time and the start time, which are included in the transaction record; and identifying, for each group, from a processing result of the third identifying and the transaction records in the group, a business flow of the group. In case of two time-point recording, it is possible to correctly identify the processing period from the start time and the end time, and also to identify the process carried out in parallel. Incidentally, the business flows of the groups may be superimposed.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

What is claimed is:

1. A non-transitory computer-readable storage medium storing a business flow processing program for causing a computer to execute a procedure comprising:
    obtaining transaction records including a processing time, a process type and an identifier from a database;
    grouping said transaction records based on said identifier, and sorting transaction records in each group based on said processing time;
    first calculating a first processing period for each of said transaction records, based on a sequence of processing times included in said transaction records within each said group, by using said processing time included in each of said transaction records as a start time;
    second calculating a second processing period for each of said transaction records, based on the sequence of the processing times included in said transaction records within each said group, by using said processing time included in each of said transaction records as an end time;
    third calculating, for each said process type, a first standard deviation of calculated first processing periods and a second standard deviation of calculated second processing periods;
    determining, based on calculated first standard deviations and calculated second standard deviations, whether said processing time represents the start time or the end time;
    generating, for each said process type, data of frequencies of the calculated processing periods that are calculated by using the processing time determined in the determining;
    first identifying transaction records relating to a process carried out in parallel based on said data of said frequencies for each said process type; and
    second identifying, for each said group, a business flow of the group from processing results of the first identifying and said transaction records within the group.

2. The non-transitory computer-readable storage medium as set forth in claim 1, wherein said first identifying comprises:
    judging, for each said process type, whether or not a plurality of peaks appear in said frequencies;
    identifying a process type for which said plurality of peaks appear, as a process carried out in parallel;
    identifying, for said process carried out in parallel, said processing period for a peak whose processing period is longest among said plurality of peaks, as a deemed processing period; and
    judging, for each of said transaction records, whether or not the pertinent transaction record is a transaction record relating to said process carried out in parallel by using said processing time for the pertinent transaction record, said deemed processing period and said processing times of other transaction records in the group of the pertinent transaction record.

3. The non-transitory computer-readable storage medium as set forth in claim 1, wherein said procedure further comprises:
    determining whether said processing time included in said transaction records includes both of said end time and said start time or either of said end time and said start time;
    upon determining that said processing time included in said transaction records includes both of said end time and said start time, third identifying, for each said group, transaction records relating to a process carried out in parallel based on said end time and said start time, which are included in said transaction records; and identifying, for each said group, a business flow of the group, based on processing result of said third identifying and said transaction records in the group, and
    upon determining that said processing time included in said transaction records includes either of said end time and said start time, the first calculating and subsequent processing are executed.

4. A non-transitory computer-readable storage medium storing a business flow processing program for causing a computer to execute a procedure comprising:

obtaining transaction records including a processing time, a process type and an identifier from a database;

grouping said transaction records based on said identifier, and sorting transaction records in each group based on said processing time;

calculating a processing period for each of said transaction records, based on a sequence of processing times included in said transaction records within each said group, in case where said processing time included in each of said transaction records represents a start time or an end time;

generating, for each said process type, data of distribution of calculated processing periods;

first identifying transaction records relating to a process carried out in parallel based on said data of said distribution for each said process type; and second identifying, for each said group, a business flow of the group from processing results of the first identifying and said transaction records within the group, and wherein said calculating comprises:

calculating a first tentative processing period for each of said transaction records in case where said processing time is assumed to be said start time, and a second tentative processing period for each of said transaction records in case where said processing time is assumed to be an end time;

calculating, for each said process type, a first index value representing dispersion of first tentative processing periods and a second index value representing dispersion of second tentative processing periods; and statistically judging, for each said process type, said processing time indicates either of said start time and said end time, by comparing said first index value with said second index value.

5. A business flow processing method, comprising:

obtaining, by using a computer, transaction records including a processing time, a process type and an identifier from a database;

grouping, by using the computer, said transaction records based on said identifier, and sorting transaction records in each group based on said processing time;

calculating, by using the computer, a first processing period for each of said transaction records, based on a sequence of processing times included in said transaction records within each said group, by using said processing time included in each of said transaction records as a start time;

calculating, by using the computer, a second processing period for each of said transaction records, based on the sequence of the processing times included in said transaction records within each said group, by using said processing time included in each of said transaction records as an end time;

calculating, by using the computer and for each said process type, a first standard deviation of calculated first processing periods and a second standard deviation of calculated second processing periods;

determining, by using the computer and based on calculated first standard deviations and calculated second standard deviations, whether said processing time represents the start time or the end time;

generating, by using the computer, for each said process type, data of frequencies of the calculated processing periods that are calculated by using the processing time determined in the determining;

first identifying, by using the computer, transaction records relating to a process carried out in parallel based on said data of said frequencies for each said process type; and second identifying, by using the computer, for each said group, a business flow of the group from processing results of the first identifying and said transaction records within the group.

6. A business flow processing apparatus, comprising:

a memory;

a storage device including a database storing transaction records including a processing time, a process type and an identifier;

a unit to obtain and store into the memory, transaction records from said database;

a unit to group said transaction records based on said identifier, and sort transaction records in each group based on said processing time;

a unit to calculate a first processing period for each of said transaction records, based on a sequence of processing times included in said transaction records within each said group, by using said processing time included in each of said transaction records as a start time, and to calculate a second processing period for each of said transaction records, based on the sequence of the processing times included in said transaction records within each said group, by using said processing time included in each of said transaction records as an end time;

a unit to calculate, for each said process type, a first standard deviation of calculated first processing periods and a second standard deviation of calculated second processing periods;

a determining unit to determine, based on calculated first standard deviations and calculated second standard deviations, whether said processing time represents the start time or the end time;

a unit to generate, for each said process type, data of frequencies of the calculated processing periods that are calculated by using the processing time determined by the determining unit;

a first identifying unit to identify transaction records relating to a process carried out in parallel based on said frequencies for each said process type; and a second identifying unit to identify, for each said group, a business flow of the group from processing results by the first identifying unit and said transaction records within the group.

* * * * *